US008434204B2

(12) United States Patent
Segawa et al.

(10) Patent No.: US 8,434,204 B2
(45) Date of Patent: May 7, 2013

(54) APPARATUS AND METHOD FOR TRIMMING

(75) Inventors: Teruo Segawa, Ayase (JP); Masaomi Umezawa, Fujisawa (JP); Masayasu Ota, Yokohama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 1393 days.

(21) Appl. No.: 11/953,392

(22) Filed: Dec. 10, 2007

(65) Prior Publication Data

US 2008/0139371 A1 Jun. 12, 2008

(30) Foreign Application Priority Data

Dec. 11, 2006 (JP) ................................. 2006-333697
Aug. 14, 2007 (JP) ................................. 2007-211308

(51) Int. Cl.
*B23P 23/00* (2006.01)
*B26D 5/20* (2006.01)

(52) U.S. Cl.
USPC ............. 29/33 P; 83/228; 83/251; 198/345.3; 29/747; 29/760

(58) Field of Classification Search .................... 29/563, 29/33 P, 33 M, 731, 747, 760; 83/228, 251–254; 198/345.3, 346.1
See application file for complete search history.

(56) References Cited

U.S. PATENT DOCUMENTS 4,624,162 A * 11/1986 Arnold .............................. 83/74
5,435,216 A 7/1995 Murphy

FOREIGN PATENT DOCUMENTS

DE 198 09 184 A1 10/1998
JP 2001-277079 A 10/2001
JP 2003-300199 A 10/2003
JP 2005-081464 3/2005

* cited by examiner

*Primary Examiner* — Erica E Cadugan
(74) *Attorney, Agent, or Firm* — Young Basile

(57) ABSTRACT

A trimming apparatus and method that can create plural trim shapes using one press die. The trimming apparatus includes a conveying device for conveying a pallet having a workpiece disposed thereon, a trimming device having a press die for trimming the workpiece in a trimming process area, a positioning device for determining the relative position of the press die with respect to the pallet and a position switching device provided in the positioning device to change operable to change the position of the press die with respect to the pallet in the trimming process area.

19 Claims, 19 Drawing Sheets

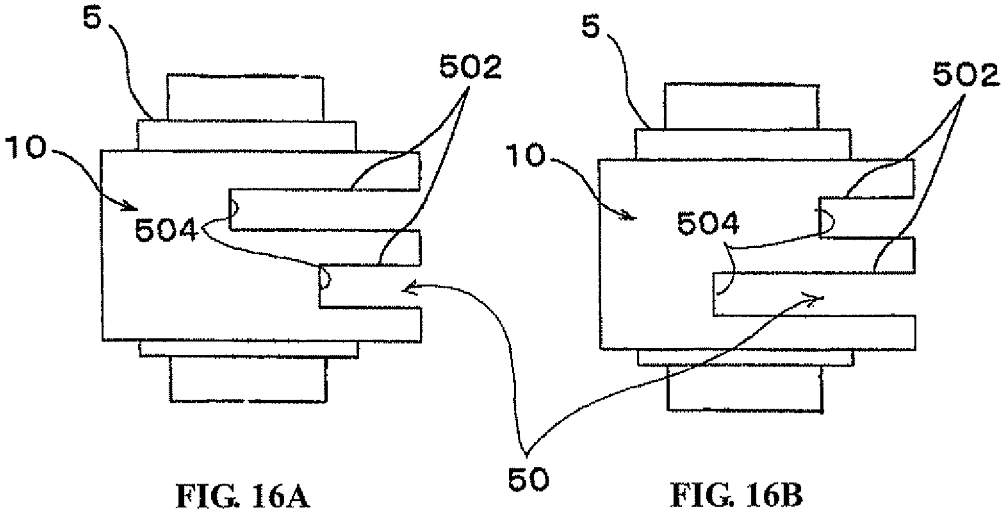
FIG. 16A
FIG. 16B
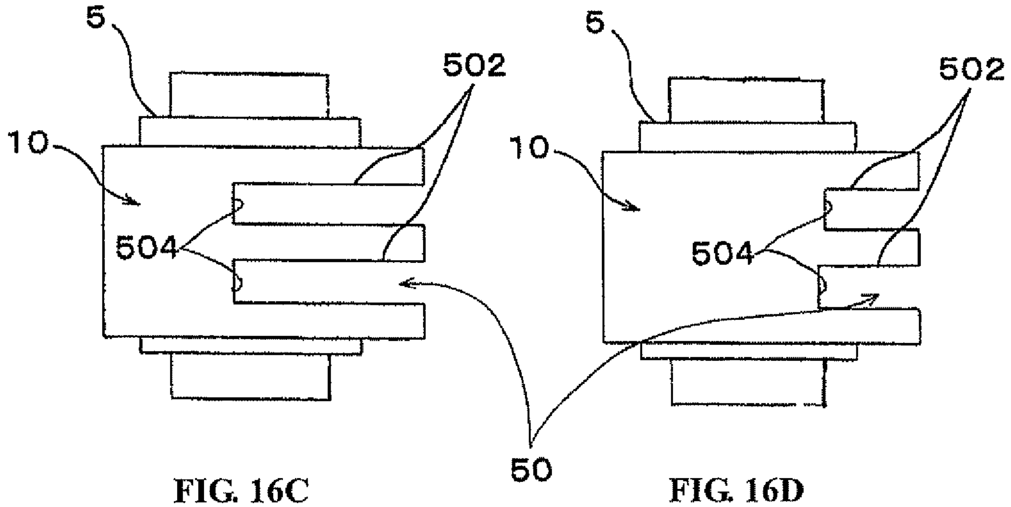
FIG. 16C
FIG. 16D

APPARATUS AND METHOD FOR TRIMMING

CROSS-REFERENCE TO RELATED APPLICATIONS

This application claims priority from Japanese Patent Application Serial No. 2006-333697, filed Dec. 11, 2006, and No. 2007-211308, filed Aug. 14, 2007, each of which is incorporated herein in its entirety by reference.

TECHNICAL FIELD

The present invention relates to an apparatus and method for trimming, which loads a workpiece on a pallet to convey and position the same as well as to trim the workpiece using a press die.

BACKGROUND

A trimming apparatus that loads a workpiece on a pallet configured to move by a conveying device, such as a conveyor, is known. For example, the apparatus shown in Japanese Patent Laid-Open Publication No. 2005-81464 is designed to convey the workpiece, position the workpiece by stopping the pallet at a predetermined position and trim the workpiece using a press die. Furthermore, this trimming apparatus is operable to align the press die with respect to the workpiece using a moving device.

BRIEF SUMMARY

One trimming apparatus taught herein includes a conveying device for conveying a pallet having a workpiece disposed thereon, a press die operable to trim the workpiece in a trimming process area, a positioning device operable to determine the position of the press die with respect to the pallet, and a position switching device operable to change the position of the press die with respect to the pallet in the trimming process area. Trimming methods are also taught herein.

BRIEF DESCRIPTION OF THE DRAWINGS

The description herein makes reference to the accompanying drawings wherein like reference numerals refer to like parts throughout the several views, and wherein:

FIG. 5A is a side view showing a trimming apparatus according to a third embodiment of the invention;

FIG. 16A is a bottom view showing a first example of the stopper coupling recesses formed at a lower portion of the pallet;

FIG. 16B is a bottom view showing a second example of the stopper coupling recesses formed at a lower portion of the pallet;

FIG. 16C is a bottom view showing a third example of the stopper coupling recesses formed at a lower portion of the pallet;

FIG. 16D is a bottom view showing a fourth example of the stopper coupling recesses formed at a lower portion of the pallet;

DETAILED DESCRIPTION OF EMBODIMENTS THE INVENTION

Hereinafter, certain embodiments of the invention are described with reference to the accompanying drawings.

A trimming apparatus according to embodiments of the invention conveys a workpiece loaded on a pallet, positions the workpiece at a predetermined position and trims the workpiece by using a press die. In prior art trimming apparatuses, a separate press die is required for each different trim shape to be applied to the workpiece, thus requiring either separate manufacturing lines for different trim shapes or plural press dies installed along one manufacturing line, each press die corresponding to a different trim shape. However, embodiments of the trimming apparatus taught herein can create plural trim shapes using a single press die, thus reducing the number of press dies required and thereby reducing equipment costs.

In general, the trimming apparatus can include a conveying device that conveys a pallet loaded with a workpiece, a trimming device having a press die for trimming the workpiece while it is disposed upon the pallet, a positioning device that determines the relative position of the press die with respect to the pallet and a position switching device for switching the relative positions of the press die and the pallet. The positioning device moves the press die or the pallet with respect to the other to determine the relative positions between the press die and the pallet. The trimming apparatus further includes a controller that controls the operation of the position switching device. After a first workpiece has been trimmed, the controller controls the operation of the position switching device to change the relative position of the second workpiece with respect to the press die so that the second workpiece may be trimmed.

By way of example, the workpiece may be an electrode plate of a lithium ion secondary battery. More particularly, the workpiece may be a battery in which a plate-shaped electrode substance extends outward from a main body of the battery. Further, the lithium ion secondary battery may be configured such that the electrode substance is trimmed to form positive and negative electrode parts. As for the conveying device, a free flow conveying device, such as a belt conveyor or a roller conveyor may be used. Alternatively, the conveying device may be a pitch-conveying device, such as a shuttle type conveying device provided with a finger part for hooking the pallet. Hereinafter, these and other embodiments of the invention are described in detail.

Figure 1:
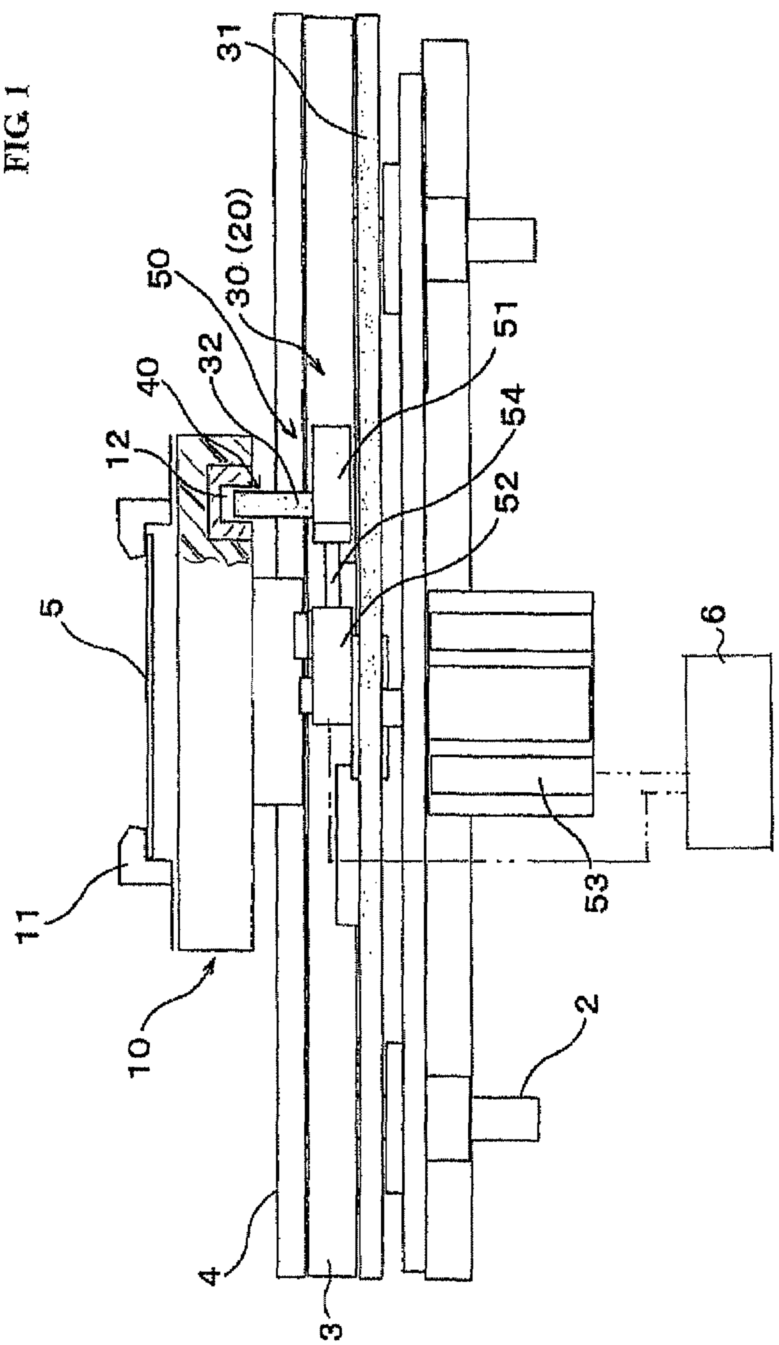
FIG. 1 is a side view illustrating a trimming apparatus according to a first embodiment of the invention.
Figure 2A:
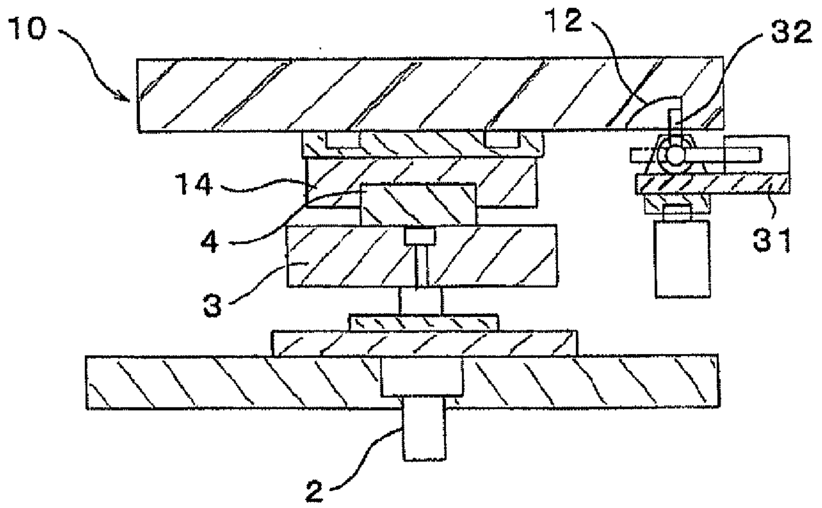
FIG. 2A is a cross-sectional view of a positioning device.

A trimming apparatus 1 according to a first embodiment of the invention is now described with reference to FIGS. 1-4. Referring to FIGS. 1 and 2A, the trimming apparatus 1 of the first embodiment includes a rail-shaped linear motion (LM) guide 4, which is mounted on a lifting base 3 capable of upward and downward movement along a plurality of guides 2. A pallet 10 loaded with a workpiece 5 moves along a longitudinally-extending direction of the LM guide 4. In other words, the longitudinally-extending direction of the LM guide 4 is the line of action along which pallet 10 is conveyed. This line of action is referred to herein as the conveying direction. The pallet 10 is mounted above the LM guide 4 and can move along the LM guide 4. The pallet 10 dispenses with an independent driving device and is moved with respect to the LM guide 4 by a conveying device 20 that is mounted on one side of the LM guide 4 and is parallel thereto.

Figure 4A:
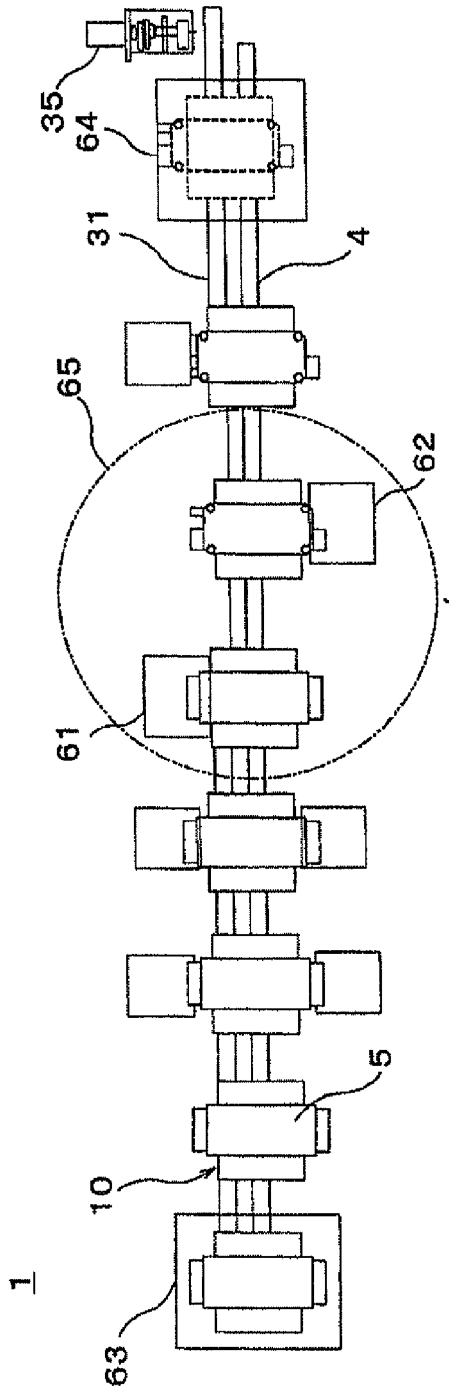
FIG. 4A is an illustration showing an assembly line according to the first embodiment.
Figure 4B:
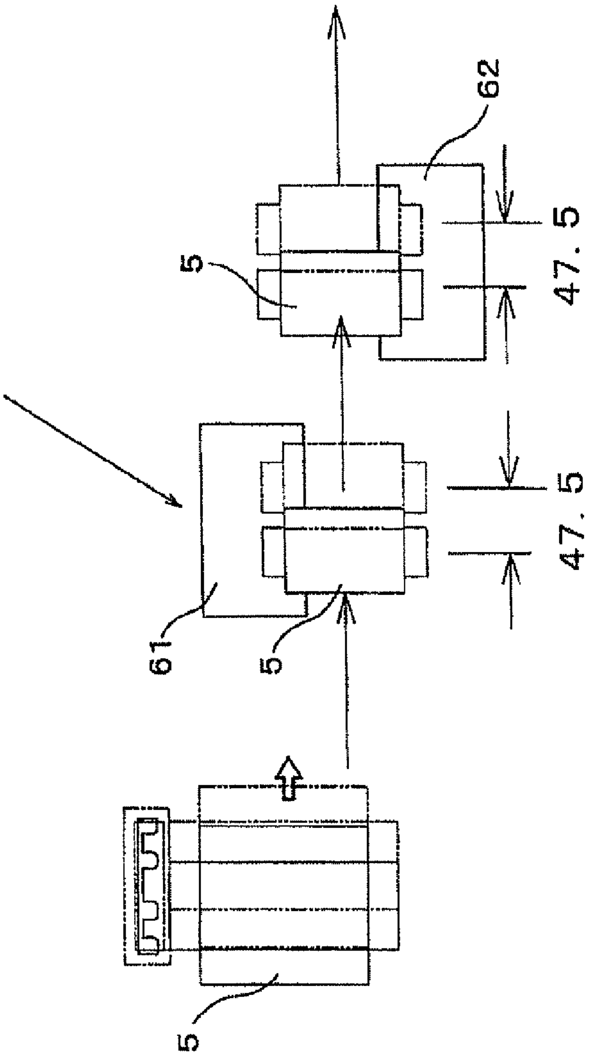
FIG. 4B is a detail view showing the trimming process area of the assembly line according to FIG. 4A.

Referring to FIGS. 4A-4B, a starting end portion of the LM guide 4 (a left end part in FIG. 4A) is an input area 63 where the pallet 10 having the workpiece 5 disposed thereon enters the area in which the trimming process occurs. A terminating end portion of the LM guide 4 (a right end part in FIG. 4A) is an output process area 64 where the pallet 10 having the workpiece 5 disposed thereon leaves the area in which the trimming process occurs after the workpiece 5 has been completely trimmed. An intermediate portion of the LM guide 4 between the input area 63 and the output area 64 is a trimming process area 65.

In the trimming process area 65, the pallet 10 is conveyed along the LM guide 4 and is stopped at a predetermined position where a trimming process is performed on the workpiece 5. Thus, plural press dies 61, 62 are mounted adjacent to the stop positions of the pallet 10 in the vicinity of the side portions of the LM guide 4 for performing the trimming process. In this embodiment, since the electrode plates of both polarities of the secondary battery of the workpiece 5 are trimmed, the workpiece 5 is loaded on the pallet 10 such that a longitudinal direction of the workpiece 5 is perpendicular to the conveying direction. The press dies, namely a first press die 61 and a second press die 62, are disposed on opposite sides of the LM guide 4, and are alternately spaced with respect to one another along the conveying direction of the LM guide 4. Alternatively, the first press die 61 and the second press die 62 may be disposed directly opposite one another along the LM guide 4, and thus aligned with respect to the conveying direction of the LM guide 4, to allow the press dies 61, 62 to simultaneously trim both end portions of the workpiece 5.

The trimming apparatus 1 employs a shuttle type conveying device 30 as the conveying device 20 of the pallet 10. The shuttle type conveying device 30 includes a shuttle bar 31 (corresponding to a shuttle member) that can move reciprocatingly. The shuttle type conveying device 30 further includes plural finger parts 32 mounted on the shuttle bar 31 that are operable to hook and release the pallet 10. Through reciprocal motion of the shuttle bar 31, the pallet 10 is pitch-conveyed. More particularly, the shuttle type conveying device 30 has the band plate-shaped shuttle bar 31 mounted near one side portion of the LM guide 4 and parallel thereto. Further, the finger parts 32 are provided at a predetermined gap on the shuttle bar 31 to hook the pallet 10. The shuttle bar 31, for example, is formed with a rack gear (not shown) on a lower surface thereof. The rack gear is engaged with a pinion gear (not shown) that is mounted on the driving shaft of a servo motor 35, as best seen in FIG. 4A. Thus, the shuttle bar 31 moves along the conveying direction.

Figure 2B:
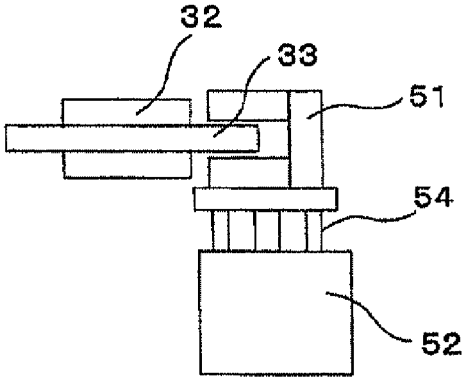
FIG. 2B is a plan view of the positioning device of FIG. 2A.
Figure 2C:
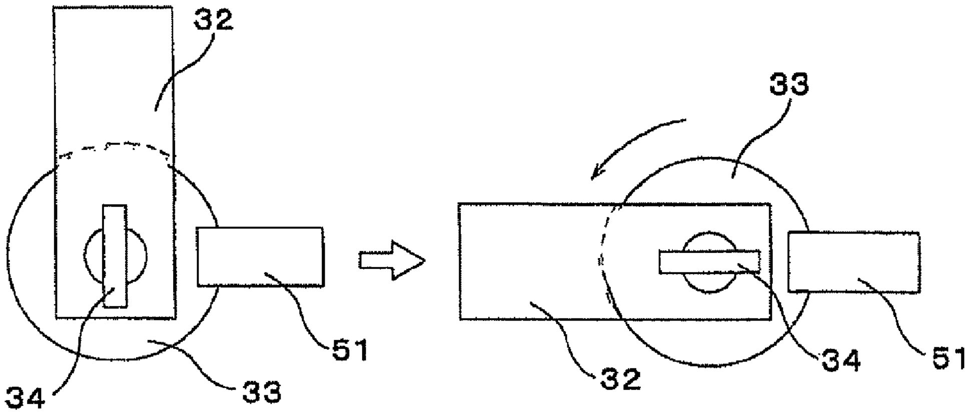
FIG. 2C is an enlarged view of a finger part of the positioning device of FIG. 2A.

Referring again to FIG. 2A, finger part 32 can be inserted into and separated from a hooking recess portion 12 formed on a front end portion or a rear end portion of the lower surface of the pallet 10. As shown in FIGS. 2B-2C, the finger part 32 of this embodiment is pivotally supported by a central portion of a circular flange part 33 and is a coupling member that is connected to a spline mechanism 34. The spline mechanism 34 pivots the finger part 32 between a substantially vertical engaged position and a substantially horizontal disengaged position. In the engaged position, the finger part 32 stands erect and is inserted into the hooking recess portion 12. In the disengaged position, the finger part 32 falls down and is separated from the hooking recess portion 12. The spline mechanism 34 is connected to a driving device (not shown), such as a rotary air cylinder, to rotate the spline mechanism 34 and thereby rotate the finger part 32.

Figure 3A:
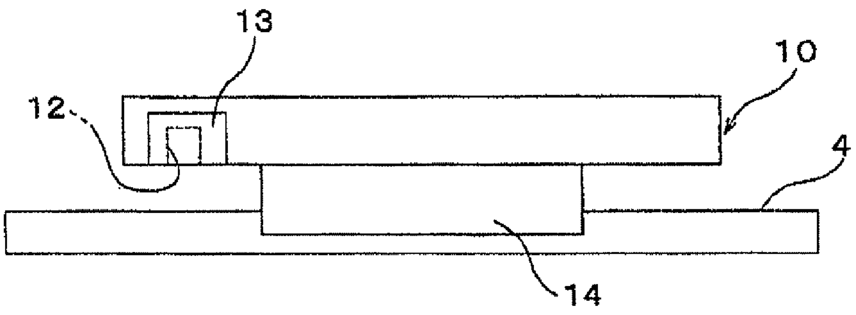
FIG. 3A is a side view showing a pallet.
Figure 3B:
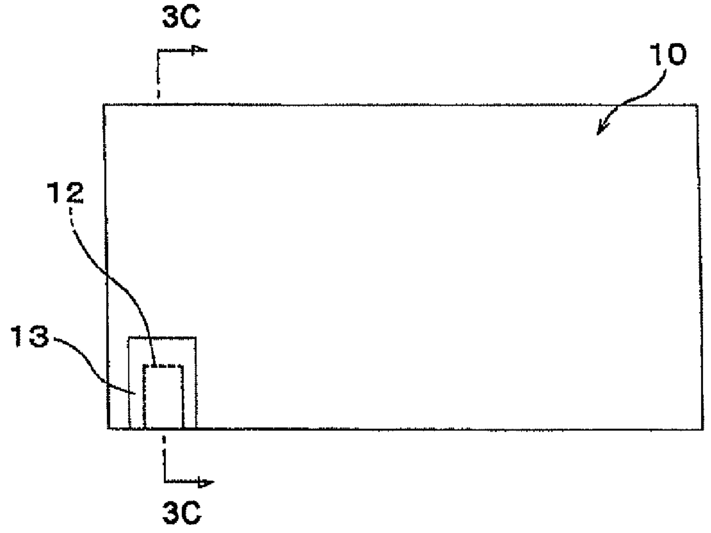
FIG. 3B is a plan view showing the pallet of FIG. 3B.
Figure 3C:
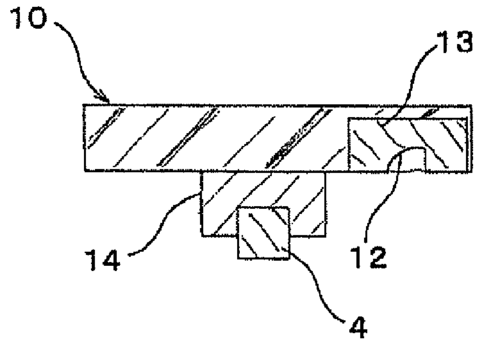
FIG. 3C is a cross-sectional view along line 3C-3C in FIG. 3B.

Referring to FIGS. 3A-3C, the pallet 10 is a rectangular plate member fabricated from a lightweight material, such as plastic, acrylic, MC nylon or the like. A clamp 11 is mounted on the pallet 10 to hold the workpiece 5, as seen in FIG. 1. A portal coupling base part 14 is mounted below the pallet 10 and is laid on the LM guide 4 to be guided therealong. As described above, the hooking recess portion 12 is formed on the front end portion or the rear end portion in the conveying direction of the lower surface of the pallet 10 for engagement with the finger part 32. Because the finger part 32 rotates by the spline mechanism 34 to be inserted into or separated from the hooking recess portion 12, the hooking recess portion 12 is formed in a circular arc shape, which corresponds to the rotation of the finger part 32. Since the finger part 32 is inserted into and separated from the hooking recess portion 12, the pallet 10 is easily flexed and worn. Thus, the hooking recess portion 12 is provided with a metallic protective frame 13 to protect the pallet 10. As a result, wear and the deterioration of positioning accuracy can be prevented, thus extending the service life of the pallet 10.

Referring back to FIGS. 1 and 2B-2C, a positioning device 40 of this embodiment is operable to move the finger part 32 to a predetermined position with respect to the LM guide 4 to determine the relative position of the press dies 61, 62 with respect to the pallet 10. A position switching device 50 is provided on the shuttle bar 31 and is configured to move the finger part 32 to plural positions along the conveying direction of the pallet 10. The position switching device 50 includes a U-shaped fork 51 coupled to the flange part 33 supporting the finger part 32. Such a device 50 also includes an advancing/retracting device 52, which is provided on the shuttle bar 31 and advances and retracts the fork 51 along the conveying direction. Furthermore, a lifting device 53 is provided for vertically moving the lifting base 3.

While the pallet 10 is being conveyed by the shuttle bar 31, the lifting device 53 moves the lifting base 3 upward. This ensures that the pallet 10 and the workpiece 5 do not collide with the lower dies of the press dies 61, 62. Once the shuttle bar 31 stops, the lifting base 3 moves downward, thereby setting the portions of the workpiece 5 that are to be trimmed on the lower dies of the press dies 61, 62. Both the advancing/retracting device 52 and the lifting device 53 may be air cylinders, but are certainly not limited thereto. By the advancing/retracting motion of the advancing/retracting device 52 of the position switching device 50, the position of the finger part 32 can be changed with respect to the conveying direction. Thus, the position of the pallet 10 coupled with the finger part 32 is also changed and determined. Furthermore, in order to improve the trimming accuracy, a well-known positioning mechanism (e.g., a positioning pin inserted through the pallet 10) may be mounted to the press dies 61, 62.

In order to control operation of the trimming apparatus 1, a controller 6 includes a CPU or a memory as a main element. More specifically, the controller 6 can be, for example, a microcomputer including a random access memory (RAM), a read-only memory (ROM) and a central processing unit (CPU) in addition to various input and output connections. Generally, the control functions are performed by execution by the CPU of one or more programs stored in ROM. The controller 6 controls the overall operation of the trimming apparatus 1, including the operation of the shuttle type conveying device 30, the operation of the advancing/retracting device 52 of the position switching device 50 and other components of the trimming apparatus 1.

Hereinafter, embodiments of a trimming method according to the invention are described with reference to operation of the trimming apparatus 1 according to the first embodiment.

The trimming method includes the steps of conveying the pallet 10 loaded with the workpiece 5 to a trimming process area, determining the relative positions of the pallet 10 with respect to the press dies 61, 62 of the trimming device, trimming the workpiece 5 using the press dies 61, 62 and conveying the pallet 10 and the trimmed workpiece 5 disposed thereon out of the trimming process area. The trimming method further includes the step of, when the first workpiece 5 has been trimmed and the second workpiece 5 is being trimmed, changing the relative position of the second workpiece 5 with respect to the press dies 61, 62 as opposed to the relative position of the first workpiece 5 with respect to the press dies 61, 62 during trimming of the first workpiece 5.

Figure 5A:
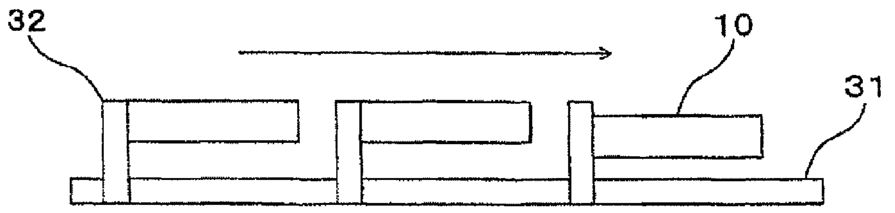
FIG. 5A is an illustration showing the operation of a shuttle type conveying device wherein the shuttle bar is moving forward.
Figure 5B:
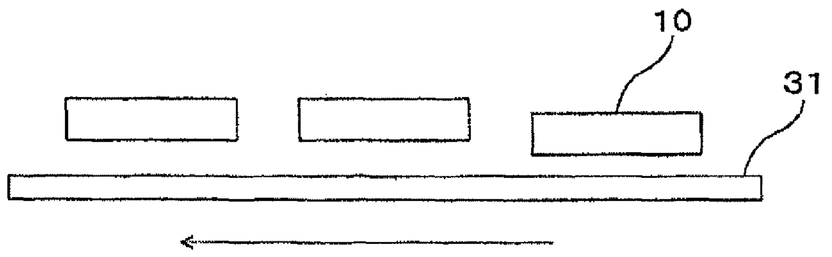
FIG. 5B is an illustration showing the operation of a shuttle type conveying device wherein the shuttle bar is returning.

Referring to FIG. 5A, the shuttle type conveying device 30 moves the shuttle bar 31 forward longitudinally by driving the servo motor 35 while the finger part 32 is inserted into the hooking recess portion 12 of the pallet 10. Thus, the pallet 10 is conveyed by a predetermined distance using the shuttle bar 31 and the finger part 32. Referring to FIG. 5B, the shuttle bar 31 is returned by separating the finger part 32 from the hooking recess portion 12 of the pallet 10 and then moving the shuttle bar 31. Since the finger part 32 is disengaged from the hooking recess portion 12, only the shuttle bar 31 returns to its original position. By repeating the reciprocating movement as described above, the shuttle type conveying device 30 pitch-conveys the pallet 10.

The pallet 10 loaded with the workpiece 5 is conveyed by the conveying device 20, and the stop position of the pallet 10 with respect to the press dies 61, 62 is changed. Further, the relative positions of the workpiece 5 and the press dies 61, 62 are switched to determine the position. In this embodiment, as described above, since the press dies 61, 62 are fixedly and alternately arranged near the both side portions of the LM guide 4, the position switching device 50 changes the position of the pallet 10 and determines the position.

In other words, the pallet 10 is pitch-conveyed by the advancing motion of the shuttle type conveying device 30 and is stopped at the working position of the front press die 61. The pallet 10 is stopped at a desired position by controlling the operation of the servo motor 35 by reading an ID of the pallet (e.g., a bar code given to the pallet 10 or the like).

In this embodiment, since the pallet 10 is conveyed along the LM guide 4, the positioning accuracy in the up/down and left/right directions of the workpiece 5 held on the pallet 10 is already guaranteed. Because the metallic protective frame 13 is mounted to the hooking recess portion 12 into which the finger part 32 is inserted, the stop accuracy of the pallet 10 can be positioned accurately by simply determining the position of the finger part 32, which is necessarily related to the stop position of the pallet 10. Accordingly, the time required for conveying and positioning is shortened. Also, since a mechanism for determining the position in the up/down and left/right directions of the pallet 10 is not necessary, equipment costs can be significantly reduced.

By moving a piston rod of the cylinder (advancing/retracting device) 52 forward and backward (advancing in this embodiment), the position of the finger part 32 can be changed by the fork 51 and the flange part 33. By this configuration, in the same press die 61, the position of the pallet 10 coupled with the finger part 32 can be changed and determined. Such a position change makes it possible to create plural trim shapes by one press die 61. Thereafter, the pallet 10 is conveyed and stopped at the rear press die 62, and the same process as the above is carried on. In this embodiment, a position changing stroke with respect to the respective press dies 61, 62 is set to 47.5 mm, as shown in FIG. 4B.

Figure 6A:
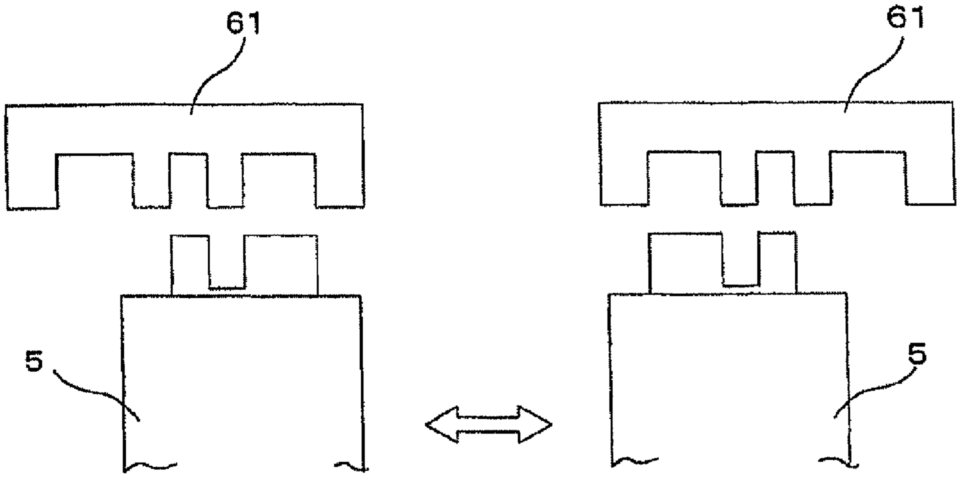
FIG. 6A is an illustration showing creation of different trim shapes using a first press die.
Figure 6B:
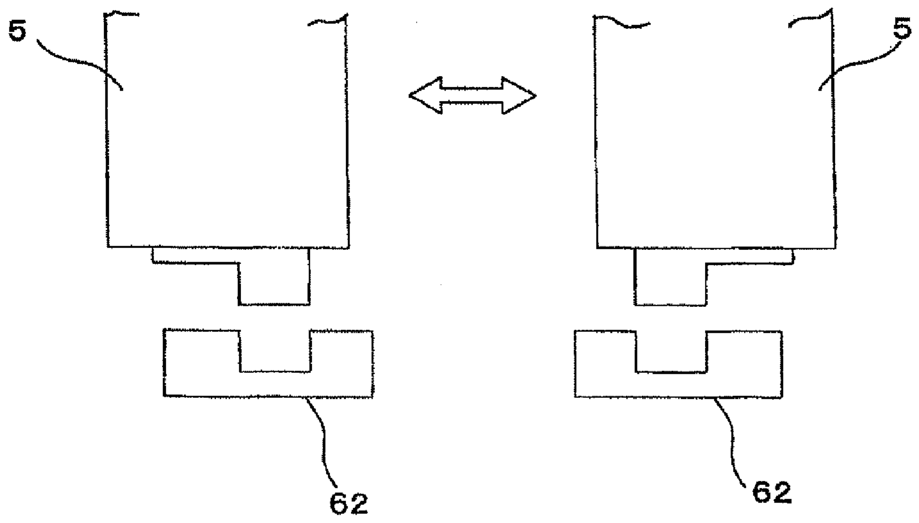
FIG. 6B is an illustration showing creation of different trim shapes using a second press die.

As shown in FIGS. 6A-6B, by changing the position of the pallet 10 through advancing and retracting the piston rod 54 of the advancing/retracting device 52, different trim shapes, which are left-right symmetric, can be formed. In other words, the stop position of the pallet 10 with respect to the press die 61 is changed by advancing and retracting the piston rod 54, thereby setting two types of trim shapes shown in FIG.

6A. Similarly, the stop position of the pallet 10 with respect to the press die 62 is changed by advancing and retracting the piston rod 54, thereby setting two types of trim shapes shown in FIG. 6B. By the combination of the trim shapes, four types of lithium ion secondary batteries having different electrode shapes can be obtained.

As described above, according to the trimming apparatus 1 and method of the first embodiment, the stop position of the pallet 10 with respect to the press dies 61, 62 is changed and determined by the shuttle type conveying device 30, the positioning device 40 and the position switching device 50. Even when creating the plural trim shapes on the workpiece 5 in the same manufacturing line, the plural trim shapes can be respectively created in each of the press dies 61, 62, thereby greatly reducing equipment costs.

Figures 7A, 7B, 7C:
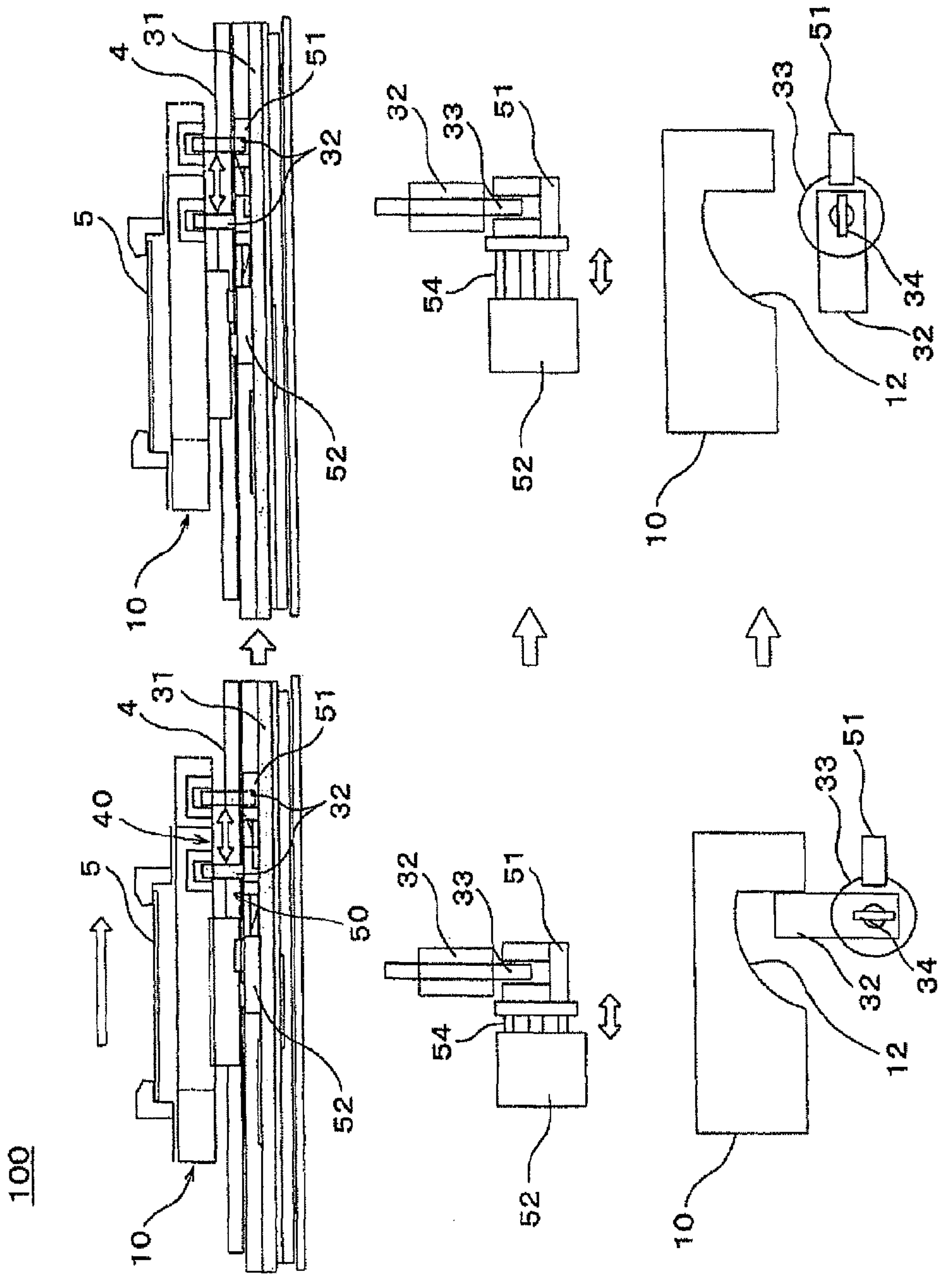
FIG. 7A is a side view illustrating a trimming apparatus according to a second embodiment of the invention.
FIG. 7B is a plan view showing a positioning device according to FIG. 7A.
FIG. 7C is an enlarged view showing components near a finger part according to FIG. 7A.
Figure 8A:
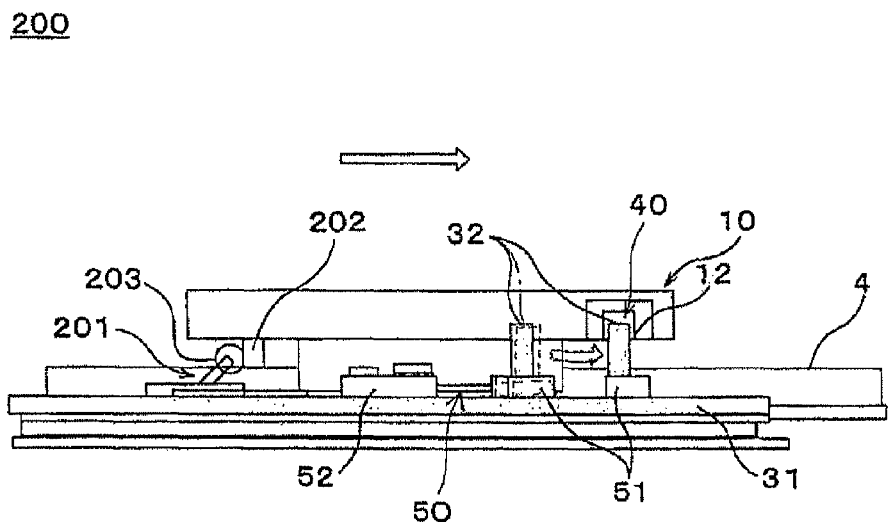
FIG. 8B is a plan view of the trimming apparatus according to FIG. 8A.
FIG. 8C is a rear view of the trimming apparatus according to FIG. 8A.
Figure 8B:
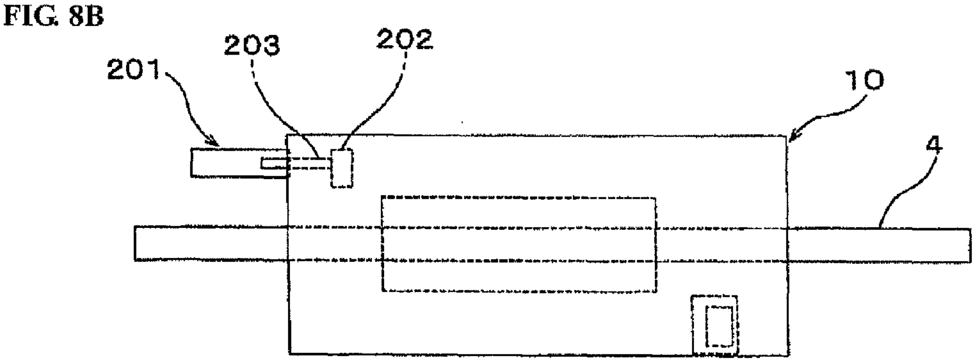
Figure 8C:
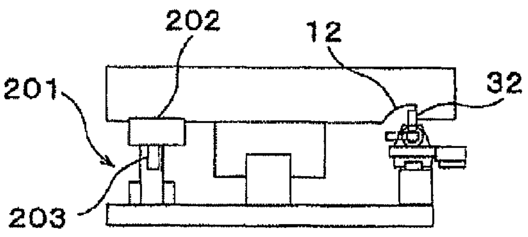

A trimming apparatus 100 according to a second embodiment of the invention is now described with reference to FIGS. 7A-7C. The trimming apparatus 100 of the second embodiment differs from the trimming apparatus 1 of the first embodiment in that the advancing/retracting device 52 of the position switching device 50 is operable while the pallet 10 is being conveyed by the shuttle type conveying device 30 is shown in FIG. 7A. The other components of the second embodiment are identical to those of the first embodiment.

In the trimming apparatus 100 according to the second embodiment, while the pallet 10 is being conveyed, but before the pallet 10 reaches the predetermined position and is stopped by the shuttle type conveying device 30, the position of the finger part 32 with respect to the conveying direction is changed using the fork 51. This is done by advancing and retracting the position rod 54 of the advancing/retracting device 52 of the position switching device 50, as shown in FIG. 7B, thereby determining the position of the pallet 10 coupled with the finger part 32 and stopping the pallet 10. Then, the trimming process is carried on by the press die 61.

After performing the trimming process by the press die 61, before the pallet 10 is conveyed to the position of the press die 62 and is stopped, the position of the finger part 32 is changed through the fork 51 similarly to the above, thereby determining the position of the pallet 10 coupled with the finger part 32 and stopping the pallet 10. Then, the trimming process is carried on by the press die 62.

By operating the position switching device 50 as described above, similarly to the first embodiment, the different trim shapes can be respectively created in each of the press dies 61, 62 are arranged near both side portions of the same manufacturing line, as shown in FIG. 4B and also shown in FIGS. 6A-6B.

The second embodiment has similar operational effects as described in connection with the first embodiment. In addition, however, the second embodiment can shorten the conveying and positioning time by operating the advancing/retracting device 52 of the position switching device 50 while the pallet 10 is conveyed before being stopped at one of the press dies 61, 62 to perform the trimming operation. As a result, the productivity of the trimming apparatus 100 is increased, allowing increased production without additional equipment, thereby significantly reducing equipment costs.

A trimming apparatus 200 constructed according to a third embodiment of the invention is now described with reference to FIGS. 8A-9B. The trimming apparatus 200 according to the third embodiment is different from the trimming apparatus of the first embodiment and the trimming apparatus 100 of the second embodiment in that the trimming apparatus 200 includes a limit switch 201 and a dog 202 as shown in FIGS. 5A-5C. The other components of the third embodiment are substantially identical to those of the first and second embodiments.

The limit switch 201 is actuated by engagement of the dog 202 with the limit switch 201 and functions to selectively operate the position switching device 50. The limit switch 201 is positioned adjacent to the LM guide 4 along the conveying path of the pallet 10 and is provided with an inclined roller part 203 mounted on the conveying path of the pallet 10. The dog 202 is any manner of structural element that is selectively attachable to the pallet 10 and operable to contact, and thus actuate, the limit switch 201. The dog 202 is mounted to a front end portion or a rear end portion of the pallet 10 while extending vertically down. If the pallet 10 moves and the roller part 203 hits the dog 202, then the limit switch 201 is turned on to operate the advancing/retracting device 52 of the position switching device 50.

By operating the position switching device 50 in response to actuation of the limit switch 201, selective operation of the position switching device 50 may be accomplished on a part-by-part basis. In particular, operation of the position switching device may be selected for each pallet 10 by providing the dog 202 on the pallet 10 if it is desired that the position switching device 50 be operated. Accordingly, when the dog 202 is attached to the pallet 10, and the pallet 10 is conveyed past the limit switch 201, the limit switch 201 is actuated by the dog 202. The position switching device 50 is thus operated. When the dog 202 is not installed on the pallet 10, the pallet 10 is conveyed past the limit switch 201 without actuating the limit switch 201. Thus, the position switching device 50 is not actuated.

Figure 9A:
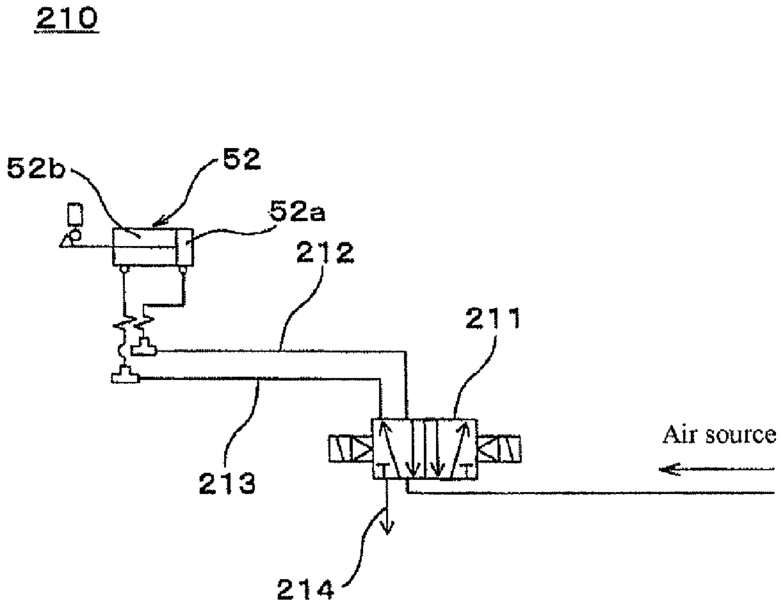
FIG. 9A illustrates an electromagnetic valve type operating system of an advancing/retracting device composing a position switching device.
Figure 9B:
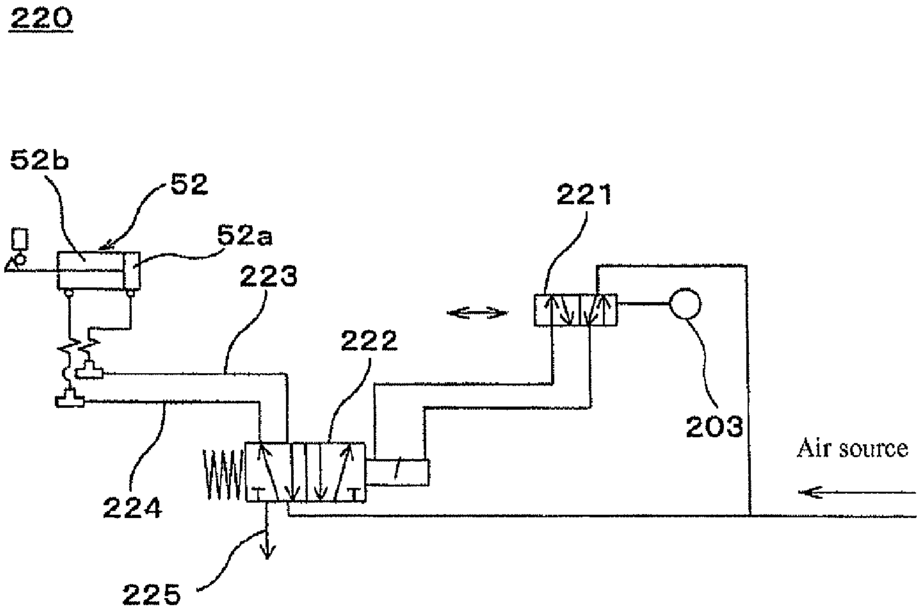
FIG. 9B illustrates an air valve type operating system of an advancing/retracting device composing a position switching device.

In order to actuate the advancing/retracting device 52 of the position switching device 50 upon actuation of the limit switch 201, the trimming apparatus 200 may be provided with either an electromagnetic valve type operating system 210 shown in FIG. 9A, or an air valve type operating system 220 shown in FIG. 9B.

In the electromagnetic valve type operating system 210, when the roller part 203 hits the dog 202, the limit switch 201 causes an electromagnetic valve 211 to open. When the electromagnetic valve 211 is opened, air is supplied to a first cylinder portion 52*a* of the advancing/retracting device 52 from an air source by way of an air-supply system 212. At the same time, air is exhausted through an exhaust port 214 by way of an exhaust system 213 from a second portion cylinder 52*b* of the advancing/retracting device 52, thereby controlling the stop position of the pallet 10.

In the air valve type operating system 220, when the roller part 203 hits the dog 202, a rotary air valve 221 is rotated to the open position thereof by the roller part 203, which causes air to be supplied to an air valve 222 and moves the air valve 222 to the open position thereof. When the air valve 222 is opened, air is supplied through the air valve 222 to the first cylinder portion 52*a* of the advancing/retracting device 52 through an air-supply system 223 from the air source. At the same time, air is exhausted through an exhaust port 225 by way of an exhaust system 224 from the second cylinder portion 52*b* of the advancing/retracting device 52, thereby changing the stop position of the pallet 10.

According to the third embodiment, since the stop position can be selectively changed by controlling the air supply to the position switching device 50 using the limit switch 201, processing delay is reduced when compared to determining whether to operate the position switching device 50 on the basis of a bar code or similar indicator on the pallet 10. Furthermore, operating the position switching device 50 on the basis of a bar code may cause erroneous position changes of the pallet 10 by directing an improper operation. However, mechanical operation of engagement of the dog 202 with the limit switch 201 according to this embodiment can prevent improper operations. Also, whether a particular pallet 10 will operate the position switching device 50 can be easily observed by noting the presence or absence of the dog 202, which facilitates maintenance activities.

Figures 10A, 10B, 10C:
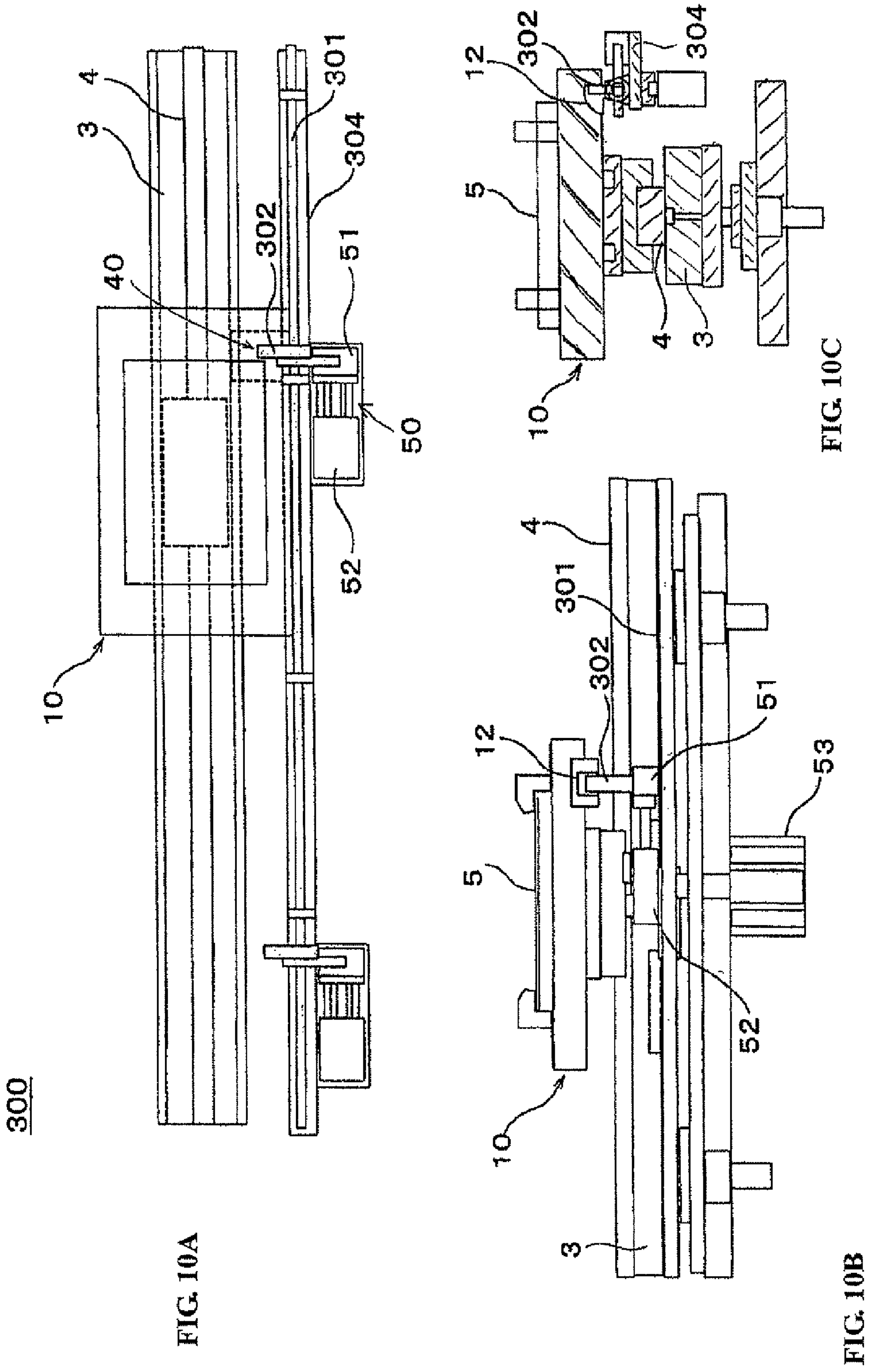
FIG. 10A is a plan view showing a trimming apparatus according to a fourth embodiment of the invention.
FIG. 10B is a side view of the trimming apparatus according to FIG. 10A.
FIG. 10C is a cross-sectional view of the trimming apparatus according to FIG. 10A.
Figure 11:
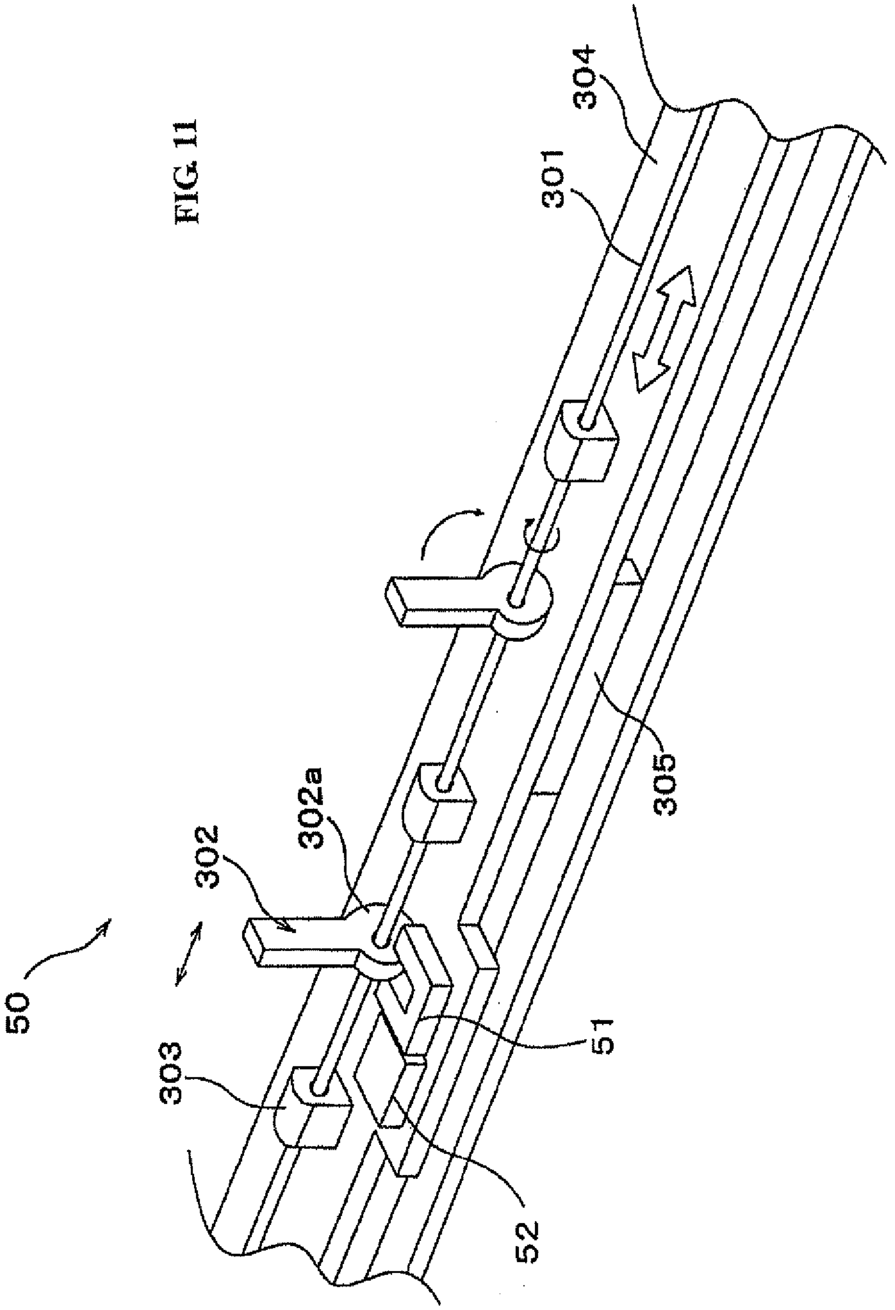
FIG. 11 is a perspective view of a conveying device and a positioning device in the trimming apparatus according to the fourth embodiment.

A trimming apparatus 300 constructed according to a fourth embodiment of the invention is now described with reference to FIGS. 10 and 11. The trimming apparatus 300 according to the fourth embodiment includes a shuttle type conveying device 30 that is of a different structure than that described in the first and second embodiments. The other components of the fourth embodiment are substantially identical to those of the first and second embodiments.

The shuttle type conveying device 30 is configured such that plural bearing supports 303 are arranged at a predetermined spacing in alignment with each other on a shuttle base 304 along the conveying direction of the LM guide 4. Further, a shuttle member or shuttle rod 301 in the form of a rotating shaft is inserted through the bearing supports 303. The shuttle rod 301 is provided with plural finger parts 302 disposed at a predetermined spacing to hook the pallet 10. Each finger part 302 has a unitarily formed circular flange portion 302*a*. The flange portion 302*a* is mounted so as to rotate with the shuttle rod 301 and slide with the shuttle rod 301. By rotating the shuttle rod 301, the finger part 302 rotates between a substantially vertical engaged position, wherein the finger part 302 is engaged with the hooking recess portion 12 of the pallet 10, and a substantially horizontal disengaged position, wherein the finger part 302 is not engaged with the hooking recess portion 12.

The advancing/retracting device 52, which advances and retracts the fork 51 of the position switching device 50, is provided on the shuttle base 304. The shuttle base 304 is supported on a slide block 305. As shown in FIG. 11, the finger part 302 need not be provided with the fork 51 or the advancing/retracting device 52 in locations where the stop position of the pallet 10 does not need to be changed.

The operational effect of the fourth embodiment is similar to the operational effect of the first and second embodiments. However, the fourth embodiment can reduce equipment costs by using a common mechanism for rotating the finger parts 302 and also by simplifying the structure of the finger part 302. This is because the finger part 302 of the shuttle type conveying device 30 is connected to the shuttle rod 301 and moves between the engaged and disengaged position by rotation of the shuttle rod 301 so as to be engaged or disengaged from the hooking recess portion 12 of the pallet 10.

Figure 12A:
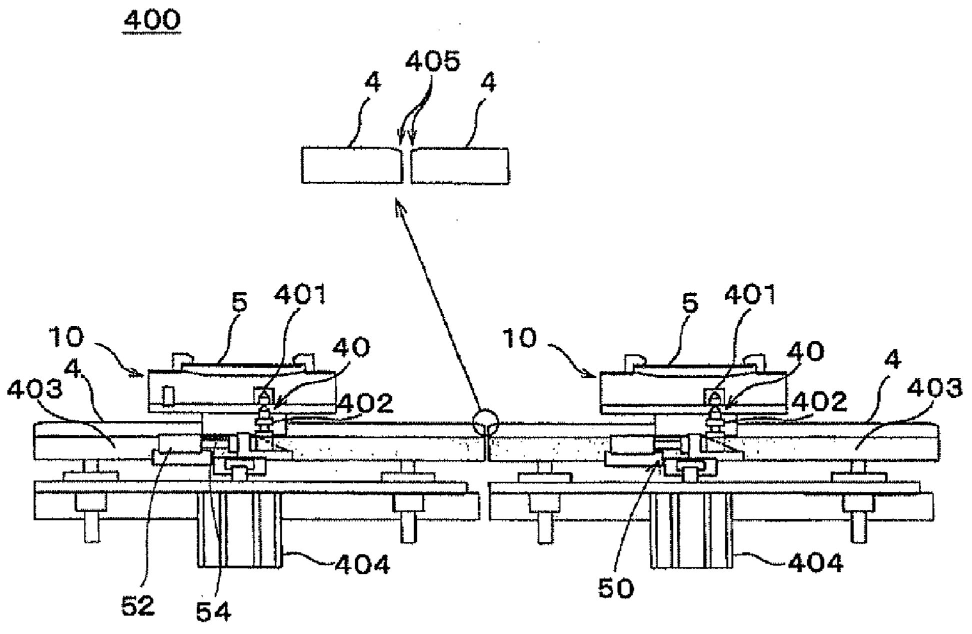
FIG. 12A is a side view showing a trimming apparatus according to a fifth embodiment of the invention.
Figure 12B:
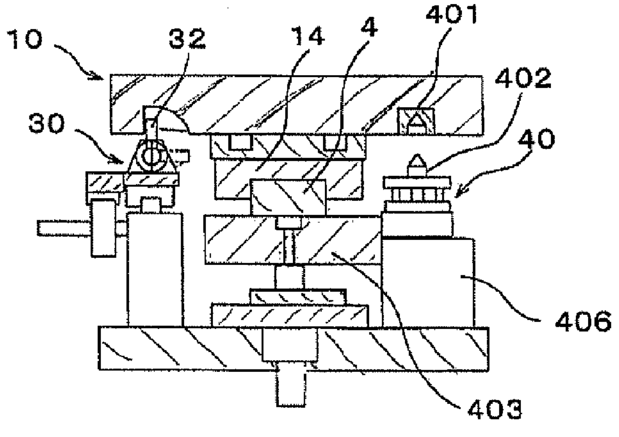
FIG. 12B is a cross-section view of the trimming apparatus according to FIG. 12A.

A trimming apparatus 400 constructed according to a fifth embodiment of the invention is now described with reference to FIGS. 12A-13C. A positioning device 40 of the trimming apparatus 400 according to the fifth embodiment includes a locate hole 401, which is formed on the lower surface of the pallet 10, and a locate pin 402 that is mounted on the conveying path of the pallet 10 and may be inserted into and separated from the locate hole 401. The position switching device 50 is configured to move the locate pin 402 to plural positions along the conveying direction of the pallet 10. As shown in FIGS. 12A and 12B, the positioning device 40, the LM guide 4 and the position switching device 50 of the trimming apparatus 400 according to the fifth embodiment have different structures as compared to the first embodiment. The other components of the trimming apparatus 400 of the fifth embodiment are substantially identical to those of the trimming apparatus 1 of the first embodiment.

The LM guide 4 is divided for each process section and is fixed on a lifting base 403, which is also divided corresponding to the LM guide 4. Each lifting base 403 is supported by a lifting device 404 so as to move up and down. The portal coupling base part 14 mounted below the pallet 10 is laid on the LM guide 4 to be guided therealong. Thus, the pallet 10 moves up and down together with the lifting base 403 by the operation of the lifting device 404. Since the LM guide 4 moves up and down, the LM guide 4 is formed with taper portions 405 at both end portions in order to smoothly guide the coupling base part 14 of the pallet 10 between the adjacent LM guides 4 at the interfaces thereof as shown in FIG. 12A.

The locate pin 402 is mounted on a slide table 406 disposed adjacent to the lifting base 403 and can move along the conveying direction. The advancing/retracting device 52 of the position switching device 50 is disposed on the slide table 406 to allow the advancing/retracting device 52 to move the locate pin 402. Thus, the slide table 406 allows for fine adjustment of an initial position of the locate pin 402. By moving the lifting device 404 down, the pallet 10 moves down together with the lifting base 403, thereby inserting the locate pin 402 into the locate hole 401 of the pallet 10. In the positioning device 40 of this embodiment, once the locate pin 402 is inserted into the locate hole 401, the locate pin 402 moves to a predetermined position, thereby moving the pallet 10 to a predetermined position so that the relative position of the press dies 61, 62 with respect to the pallet 10 can be determined. The position switching device 50 of this embodiment is provided on the slide table 406, which is separate from the shuttle type conveying device 30, and is configured to move the locate pin 402 to plural positions along the conveying direction of the pallet 10 using the advancing/retracting device 52.

Figure 13A:
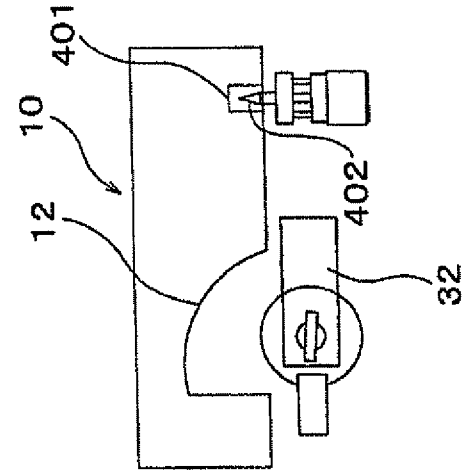
FIG. 13A is an illustration showing a positioning device in the trimming apparatus according to the fifth embodiment wherein a finger part is in a coupled state.
Figure 13B:
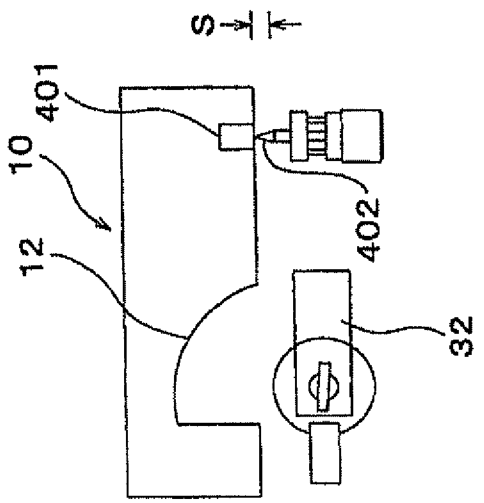
FIG. 13B is an illustration showing a positioning device in the trimming apparatus according to the fifth embodiment wherein the finger part is in a separated state.
Figure 13C:
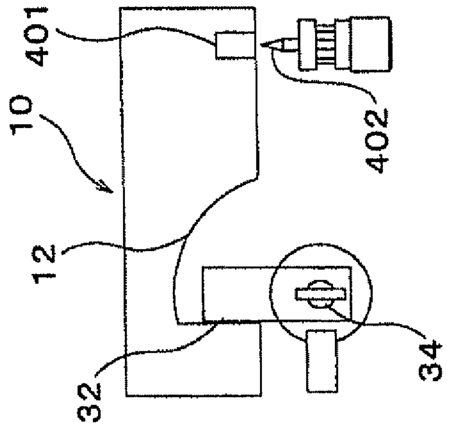
FIG. 13C is an illustration showing a positioning device in the trimming apparatus according to the fifth embodiment wherein a locate pin is in a coupled state.

In the trimming apparatus 400, the pallet 10 is conveyed and stopped at a predetermined position while the finger part 32 of the shuttle type conveying device 30 is inserted into the hooking recess portion 12 of the pallet 10 as shown in FIG. 13C. Then, the finger part 32 rotates to the disengaged position by the operation of the spline mechanism 34 of the finger part 32 and is thus separated from the hooking recess portion 12 of the pallet 10 as shown in FIG. 13B. Thereafter, by moving the lifting device 404 downward, the pallet 10 and the lifting base 402 move downward together by a distance equal to a descending stroke of the pallet 10. In this manner, the locate pin 402 is inserted into the locate hole 401 of the pallet 10 as shown in FIG. 13A.

If the position of the locate pin 402 is moved by the advancing/retracting device 52, then the position of the pallet 10 is moved to a predetermined position and determined as described in the first embodiment. Further, the different trim shapes, which are left-right symmetric, can be formed by each of the press dies 61, 62 that are arranged near the side portions of the manufacturing line as shown in FIGS. 6A-6B.

The fifth embodiment has a similar operational effect as described in the first embodiment. According to the fifth embodiment, a positioning time is needed because the positioning device 40 is composed of the locate hole 401 of the pallet 10 and the locate pin 402. However, since it is not necessary to install an advancing/retracting device on an operating part such as a shuttle bar, the apparatus is simplified, thereby improving the operational reliability and reducing equipment costs.

A trimming apparatus 500 constructed according to a sixth embodiment of the invention is now described with reference to FIGS. 14-16D. The trimming apparatus 500 is configured such that the positioning device 40 includes stopper coupling recesses 502, which are formed on the front surface of the pallet 10 with respect to the conveying direction of the pallet 10. Stoppers 503 can be inserted into and separated from the stopper coupling recesses 502. Contact surfaces 504 are formed at the interior end portions of the stopper coupling recesses 502 for engagement with the stoppers 503. The position switching device 50 is configured to make lengths in the conveying direction of the stopper coupling recesses 502 different from each other.

Figure 14:
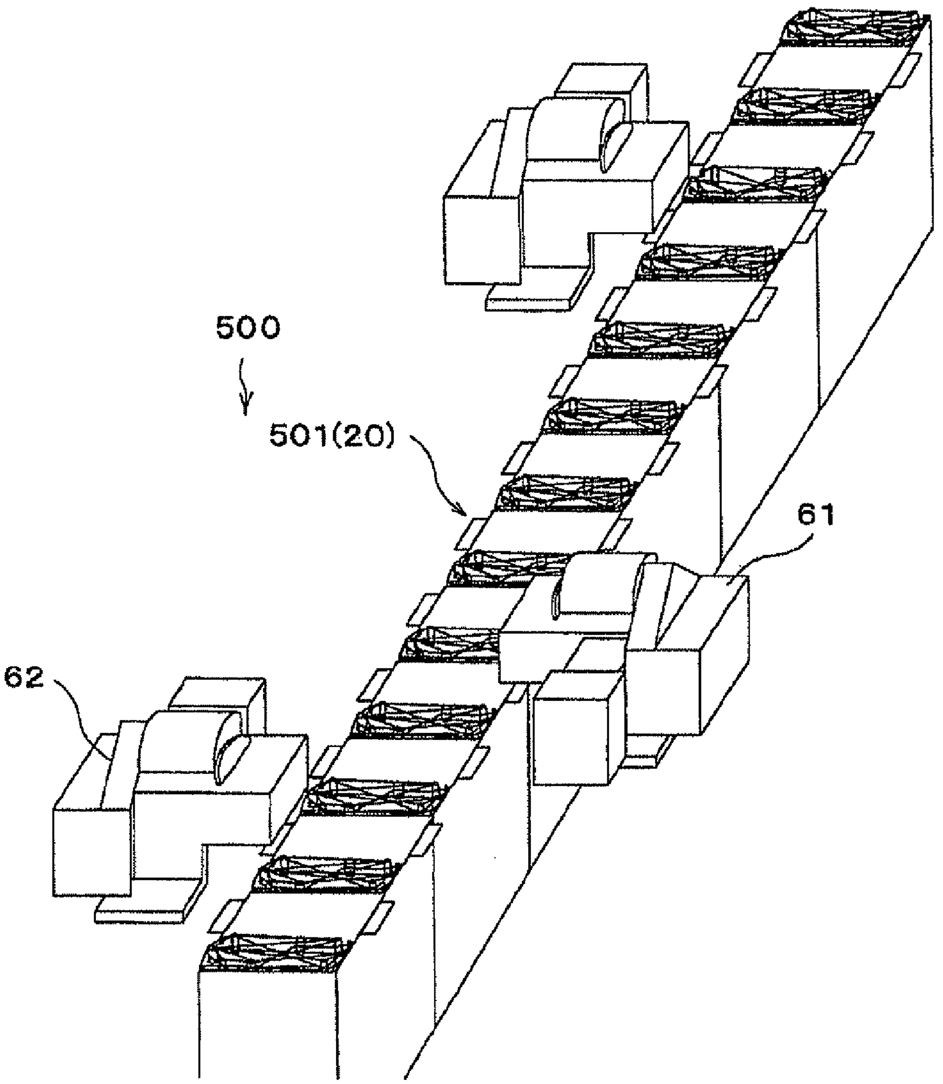
FIG. 14 is a perspective view showing a conveying device in a trimming apparatus according to a sixth embodiment of the invention.

As shown in FIG. 14, the conveying device 20 and the positioning device 40 of the trimming apparatus 500 according to the sixth embodiment have different structures as compared to the first embodiment. The other components of the sixth embodiment are substantially the same as those of the first embodiment. In other words, the conveying device 20 of the trimming apparatus 500 according to the sixth embodiment is configured as a belt conveyor 501, which performs free flow conveying, although it is certainly not limited thereto. Other free flow conveying devices, such as a roller conveyor or the like, may be employed. Furthermore, this embodiment exemplifies that the workpiece 5 is a lithium ion secondary battery formed in a flat shape, both electrodes of an electrode plate of the lithium ion secondary battery are processed, and both end portions perpendicular to the conveying direction of the workpiece 5 are trimmed. Thus, the press dies 61, 62 are arranged alternately near the both side portions of the belt conveyor 501.

Figure 15:
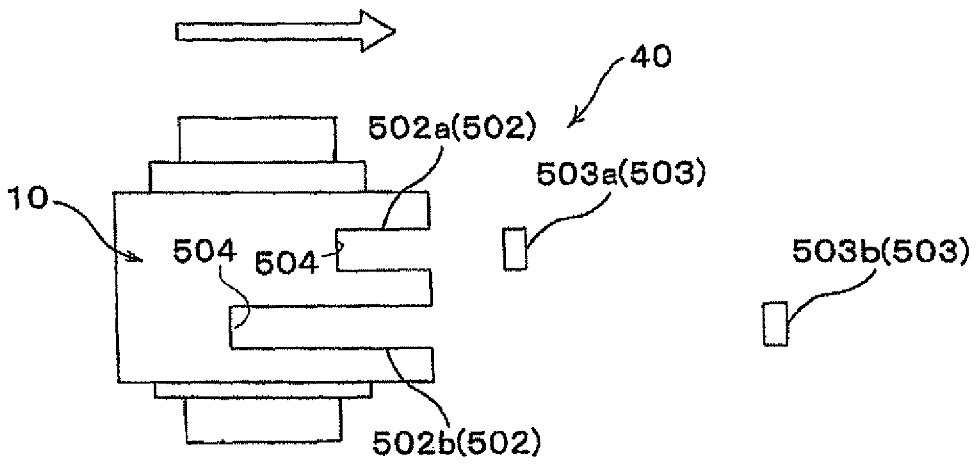
FIG. 15 is an illustration showing the relationship between stoppers and stopper coupling recesses.

As best seen in FIG. 15, the positioning device 40 includes the stopper coupling recesses 502 formed on the surface of the pallet 10 and the stoppers 503 mounted along the conveying path of the pallet 10 so as to advance and retract and to be inserted into the stopper coupling recesses 502. The pallet 10 is conveyed by the belt conveyor 501 and the contact surfaces 504 of the end portions of the stopper coupling recesses 502 engage the stoppers 503 to position the pallet 10 to a predetermined position.

The stoppers 503 are mounted on two positions on the left and right sides in a direction perpendicular to the conveying direction in order to correspond to the press dies 61, 62 that are mounted near the sides of the belt conveyor 501. The stopper 503*a* is mounted to the press die 61, and the stopper 503*b* is mounted to the press die 62. The stoppers 503 (503*a* and 503*b*) are configured to advance and retract vertically by an advancing/retracting device, such as a cylinder.

The stopper coupling recesses 502 are formed on the lower surface of the pallet 10 and include two concave recesses 502*a* and 502*b* corresponding to the stoppers 503*a* and 503*b*, respectively. When the contact surface 504 of the stopper coupling recess 502*a* comes into engagement with the stopper 503*a*, the position of the pallet 10 is determined to be in a first predetermined position with respect to the press die 61. By the contact surface 504 of the end portion of the stopper coupling recess 502*b* colliding with the stopper 503*b*, the position of the pallet 10 is determined to be in a second predetermined position with respect to the press die 62. Accordingly, by providing the pallets 10 having the stopper coupling recesses 502*a* of different lengths, the respective pallet 10 can be stopped at different positions with respect to the press die 61. Similarly, by providing the pallets 10 with the stopper coupling recesses 502*b* of different lengths, the respective pallet 10 can be stopped at different positions with respect to the press die 62.

FIGS. 16A to 16D show four different pallets 10. The stopper coupling recesses 502*a* and 502*b* are provided in two different lengths. By combining the long and short stopper coupling recesses 502*a* and 502*b*, the four different kinds of pallets 10 are provided. FIG. 16A shows the pallet 10 having a long stopper coupling recess 502*a* and a short stopper coupling recess 502*b*. FIG. 16B shows the pallet 10 having a short stopper coupling recess 502*a* and a long stopper coupling recess 502*b*. FIG. 16C shows the pallet 10 having a long stopper coupling recess 502*a* and a long stopper coupling recess 502*b*. FIG. 16D shows the pallet having a short stopper coupling recess 502*a* and a short stopper coupling recess 502*b*.

In this embodiment, by providing two lengths for the stopper coupling recess 502*a*, engagement of the contact surface 504 of the stopper coupling recess 502*a* with the stopper 503*a* provides two stop positions of the pallet 10 with respect to the press die 61, thereby allowing formation of two kinds of trim shapes. Similarly, by providing two lengths for the stopper coupling recess 502*b*, engagement of the contact surface 504 with the stopper 503*b* provides two stop positions of the pallet 10 with respect to the press die 62, thereby forming two different trim shapes. By combining the trim shapes in all of the available permutations, it is possible to obtain four kinds of lithium ion secondary batteries having different electrode shapes.

According to the sixth embodiment, the stop position of the pallet 10 can be changed and determined by the stopper coupling recesses 502 formed on the lower surface of the pallet 10 through engagement of the stoppers 503 with the contact surfaces 504 of the stopper coupling recesses 502. By this configuration, plural trim shapes can be formed by each of the press dies 61, 62. Accordingly, this embodiment can reduce the number of press dies when compared to a conventional trimming apparatus which needs a plurality of press dies to form plural different trim shapes on the same manufacturing line. Further, the formation of the plural trim shapes can be achieved by merely forming the recesses at the pallet 10 and installing the stoppers 503, thereby reducing equipment costs.

Figure 17:
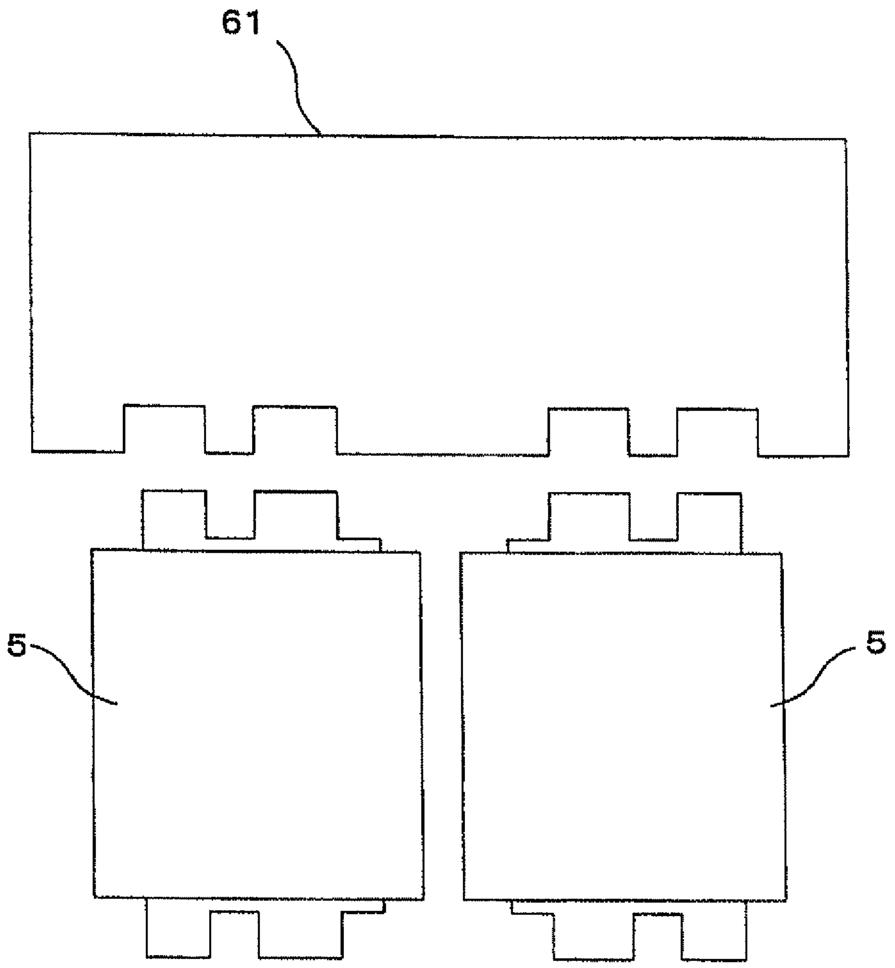
FIG. 17 is a plan view showing the formation of plural trim shapes by one press die.

Still further, when forming different trim shapes it may be good to modify the shapes of the press dies 61, 62 so as to create two kinds of trim shapes using one press die as shown in FIG. 17.

Figure 18:
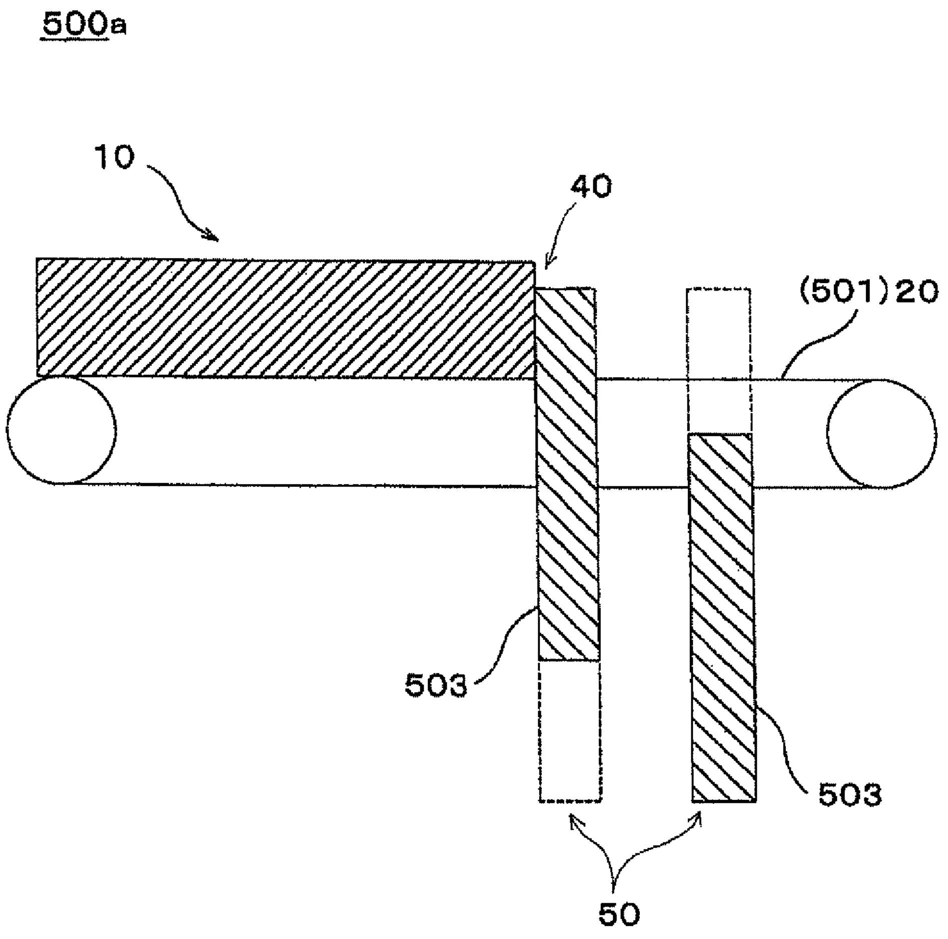
FIG. 18 is a side view showing a trimming apparatus according to a seventh embodiment of the invention.

A trimming apparatus 500*a* constructed according to a seventh embodiment of the invention is now described with reference to FIG. 18.

The trimming apparatus 500*a* according to the seventh embodiment is configured such that the positioning device 40 includes plural stoppers 503 mounted along the conveying direction of the pallet 10 so as to be engaged with and separated from the pallet 10. The position switching device 50 is configured to select one of the plural stoppers 503, which is then engaged with the pallet 10. As shown in FIG. 18, the trimming apparatus 500*a* according to the seventh embodiment differs from the sixth embodiment in that the plural stoppers 503 are arranged along the conveying direction. The other components of the trimming apparatus 500*a* of the seventh embodiment are substantially the same as those of the trimming apparatus 500 of the sixth embodiment.

The positioning device 40 includes the plural stoppers 503 mounted along the conveying path of the pallet 10 so as to advance and retract for engagement with a portion of the pallet 10. Similar to the sixth embodiment, stopper coupling recesses, into which the stoppers 503 are inserted, may be formed at the front portion of the lower surface of the pallet 10. However, it should be understood that it is not necessary to prepare plural kinds of pallets having stopper coupling recesses of different lengths.

The respective stoppers 503 are configured to advance and retract vertically by an advancing/retracting device, such as a cylinder. In order to stop the pallet 10 at a predetermined location, one of the plural stoppers 503 is moved to a position in which the stopper 503 can engage the pallet 10.

According to the seventh embodiment, the stop position of the pallet 10 can be changed and determined by selectively operating only one of the plural stoppers 503, thus allowing plural trim shapes to be formed by each of the press dies 61, 62. Further, since multiple types of pallets 10 are not needed, equipment costs can be reduced.

Figure 19:
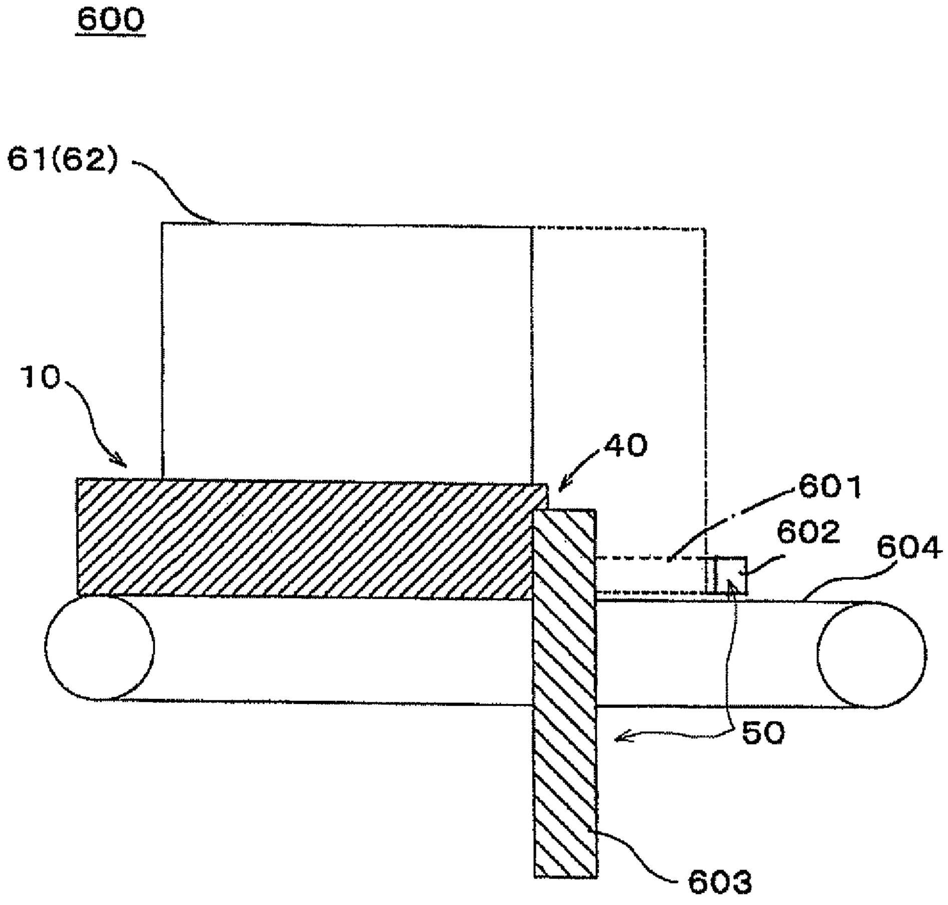
FIG. 19 is a side view showing a trimming apparatus according to an eighth embodiment of the invention.

A trimming apparatus 600 constructed according to an eighth embodiment of the invention is now described with reference to FIG. 19. The positioning device 40 of the trimming apparatus 600 includes a slide table 601 upon which the press dies 61, 62 are mounted for movement along the conveying direction of the pallet 10. The positioning device 40 of the trimming apparatus 600 further includes plural stoppers 602 and 603 that are mounted along the moving direction of the slide table 601 and can be engaged to and separated from the slide table 601. The position switching device 50 is configured to select and engage one stopper 602 (or 603) of the plural stoppers 602 and 603 for engagement with table 601. As shown in FIG. 19, the trimming apparatus 600 according to the eighth embodiment is different from the trimming apparatus 500 of the sixth embodiment in that the positioning device 40 is provided at the press dies 61, 62. Also, in the eighth embodiment each of the press dies 61, 62 is loaded on the slide table 601 that is mounted movably along the same direction as the conveying direction. The other components of the eighth embodiment are substantially the same as those of the sixth embodiment.

The positioning device 40 is mounted on the moving path of the slide table 601 so as to advance and retract and includes the stopper 603, which is engageable with the slide table 601. When the stopper 603 is coupled to the slide table 601, as shown by solid lines in FIG. 19, the press dies 61, 62 are determined to be in a first position. When the stopper 603 is separated from the slide table 601, the slide table 601 comes into contact with the fixing type stopper 602, and as shown by a dotted line in FIG. 19, the press dies 61, 62 are determined to be in a second position in the drawing. The stopper 603 is configured to advance and retract vertically by an advancing/retracting device, such as a cylinder.

It should be understood from the foregoing that the trimming apparatus 60 may be used with a plurality of identical pallets 10 or a plurality of diverse pallets 10, as previously described. Furthermore, in this embodiment a belt conveyor 604 is used as the conveying device 20; however, it should be understood that pitch-conveying may be performed by employing the aforesaid shuttle type conveying device in order to stop the pallet 10 at a predetermined position with a high degree of precision.

According to the eighth embodiment, the plural trim shapes can be formed by one press die 61 or 62 by changing the position of the press die 61 or 62 with respect to the stop position of the pallet 10 by using the slide table 601 and the stoppers 602 and 603. Further, the formation of the plural trim shapes can be achieved by having the press dies 61, 62 and the stoppers 602 and 603 disposed on the slide table 601, thereby reducing equipment costs.

Further, the trimming apparatus and the trimming method according to embodiments of the invention can be broadly applied to the formation of the plural different trim shapes on the workpiece conveyed in the same manufacturing line, as well as the trimming of the electrode plate of the lithium ion secondary battery formed in a flat shape.

As apparent from the above description, embodiments taught herein can reduce equipment costs, because the plural trim shapes can be formed by one press die even when creating the plural trim shapes on the workpiece in the same manufacturing line, by changing and determining the relative positions of the press dies and the pallet when trimming the workpiece on the pallet by the trimming device.

The above-described embodiments have been described in order to allow understanding of the invention and do not limit the invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A trimming apparatus, comprising:

a conveying device for conveying a pallet having a workpiece disposed thereon;

a press die operable to form a first trim shape on the workpiece when the pallet is positioned in a first predetermined position with respect to the press die, and operable to form a second trim shape on the workpiece when the pallet is positioned in a second predetermined position with respect to the press die;

a positioning device operable to set the position of the pallet with respect to the press die to the first predetermined position;

a position switching device operable to change the position of the pallet with respect to the press die to the second predetermined position; and a control device configured to enable the production of both the first and second trim shapes by being configured to selectively either control the position switching device to position the pallet at the first predetermined position with respect to the press die and thereafter operate the press die to form the first trim shape on the workpiece while the pallet is positioned at the first predetermined position, or control the position switching device to position the pallet at the second predetermined position with respect to the press die, and thereafter operate the press die to form the second trim shape on the workpiece while the pallet is positioned at the second predetermined position.

2. The trimming apparatus according to claim 1 wherein the conveying device is a shuttle type conveying device including:

a reciprocating shuttle member having a plurality of finger parts mounted thereon for movement between an engaged position wherein a finger part of the plurality of finger parts engages the pallet so that movement of the shuttle member moves the pallet and a disengaged position wherein the finger part of the plurality of finger parts does not engage the pallet so that the shuttle member may move with respect to the pallet; and wherein the position switching device is mounted on the shuttle member for moving the finger parts to a predetermined position with respect to the press die.

3. The trimming apparatus according to claim 2 wherein the position switching device is configured to move the finger parts while the pallet is conveyed.

4. The trimming apparatus according to claim 2, further comprising:

a recess portion formed on the pallet for receiving the finger part of the plurality of finger parts therein, wherein the finger parts are rotatable between the engaged position and the disengaged position.

5. The trimming apparatus according to claim 2, further comprising:

a limit switch mounted along a conveying path of the pallet, wherein actuation of the limit switch is configured to operate the position switching device; and a switch operating part selectively attached to the pallet and operable to engage the limit switch to actuate the limit switch and thereby operate the position switching device.

6. The trimming apparatus according to claim 5 wherein the switch operating part is selectively attachable to and detachable from the pallet.

7. The trimming apparatus according to claim 1 wherein the positioning device further comprises:

a locate hole formed in the pallet; and a locate pin mounted on a conveying path of the pallet so as to be inserted into and separated from the locate hole, wherein the position switching device is operable to move the locate pin to a predetermined position along a conveying direction of the pallet.

8. The trimming apparatus according to claim 1 wherein the positioning device further comprises:

a plurality of stopper coupling recesses formed on the pallet, each having a respective contact surface formed at a respective end thereof; and a plurality of stoppers, each being capable of being inserted into and separated from a respective one of the stopper coupling recesses, wherein the stoppers are each engageable with a respective one of the contact surfaces of a respective one of the stopper coupling recesses; and wherein the position switching device is operable to stop the pallet at the predetermined positions according to lengths of the stopper coupling recesses.

9. The trimming apparatus according to claim 1 wherein the positioning device further comprises:

a plurality of stoppers mounted along a conveying direction of the pallet for engagement and disengagement with the pallet; and wherein the position switching device is configured to select a stopper of the plurality of stoppers for engagement with the pallet.

10. The trimming apparatus according to claim 1 wherein the positioning device further comprises:

a slide table movably mounted along a conveying direction of the pallet and having the press die disposed thereon; and a plurality of stoppers mounted along a conveying direction of the pallet for engagement and disengagement with the slide table; wherein the position switching device is configured to select a stopper of the plurality of stoppers for engagement with the slide table.

11. The trimming apparatus according to claim 1 wherein the workpiece is a battery having a plate-shaped electrode extending outward from a main body of the battery; and wherein the press die trims the electrode to form positive (+) and negative (−) electrode parts.

12. The trimming apparatus according to claim 1 wherein the press die has a profile configured to form the first trim shape on the workpiece when the pallet is positioned in the first predetermined position with respect to the press die, wherein the profile is configured to form the second trim shape on the workpiece when the pallet is positioned in the second predetermined position with respect to the press die.

13. A trimming apparatus, comprising:

means for conveying a pallet having a workpiece disposed thereon;

means for trimming the workpiece according to a first trim shape when the pallet is positioned in a first predetermined position with respect to the means for trimming, and according to a second trim shape when the pallet is positioned in a second predetermined position with respect to the means for trimming;

means for setting the position of the pallet with respect to the means for trimming to the first predetermined position;

means for changing the position of the pallet with respect to the means for trimming to the second predetermined position; and means for enabling the production of both the first and second trim shapes by being configured for selectively either controlling the position switching device to position the pallet at the first predetermined position with respect to the press die, and thereafter operate the press die to form the first trim shape on the workpiece while the pallet is positioned at the first predetermined position, or controlling the position switching device to position the pallet at the second predetermined position with respect to the press die, and thereafter operate the press die to form the second trim shape on the workpiece while the pallet is positioned at the second predetermined position.

14. The trimming apparatus according to claim 13 wherein the means for trimming the workpiece is a press die, and wherein the press die has a profile configured to form the first trim shape on the workpiece when the pallet is positioned in the first predetermined position with respect to the press die, wherein the profile is configured to form the second trim shape on the workpiece when the pallet is positioned in the second predetermined position with respect to the press die.

15. A trimming apparatus, comprising:

a shuttle type conveying device, for conveying a pallet having a workpiece disposed thereon, the shuttle type conveying device including a reciprocating shuttle member having a plurality of finger parts mounted thereon for movement between an engaged position wherein a finger part of the plurality of finger parts engages the pallet so that movement of the shuttle member moves the pallet and a disengaged position wherein the finger part of the plurality of finger parts does not engage the pallet so that the shuttle member may move with respect to the pallet;

a press die operable to form a first trim shape on the workpiece when the pallet is positioned in a first predetermined position with respect to the press die, and operable to form a second trim shape on the workpiece when the pallet is positioned in a second predetermined position with respect to the press die;

a positioning device operable to set the position of the pallet with respect to the press die to the first predetermined position; and a position switching device mounted on the shuttle member for moving the finger parts to a predetermined position with respect to the press die and operable to change the position of the pallet with respect to the press die to the second predetermined position.

16. The trimming apparatus according to claim 15, wherein the position switching device is configured to move the finger parts while the pallet is conveyed.

17. The trimming apparatus according to claim 15, further comprising:

a recess portion formed on the pallet for receiving the finger part of the plurality of finger parts therein, wherein the finger parts are rotatable between the engaged position and the disengaged position.

18. The trimming apparatus according to claim 15, further comprising:

a limit switch mounted along a conveying path of the pallet, wherein actuation of the limit switch is configured to operate the position switching device; and a switch operating part selectively attached to the pallet and operable to engage the limit switch to actuate the limit switch and thereby operate the position switching device.

19. The trimming apparatus according to claim 18 wherein the switch operating part is selectively attachable to and detachable from the pallet.

* * * * *